Patented Dec. 29, 1942

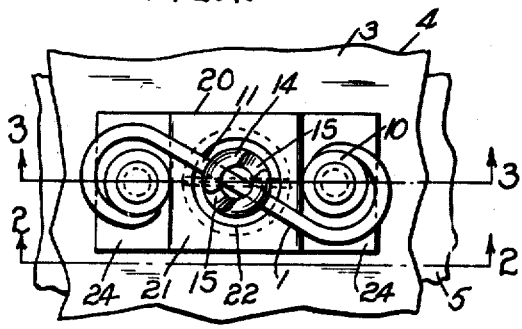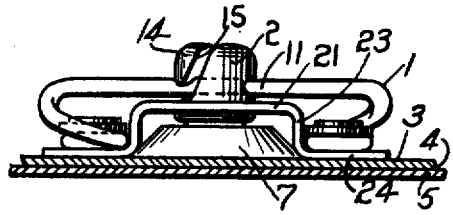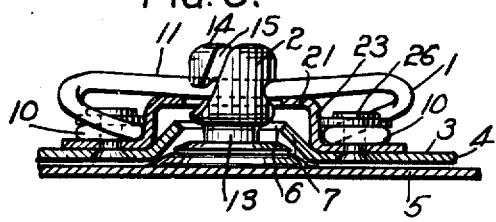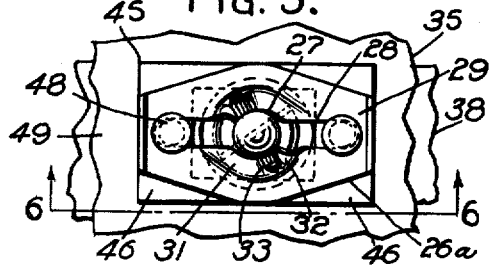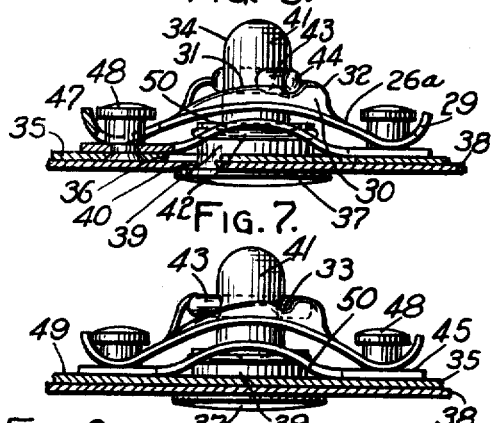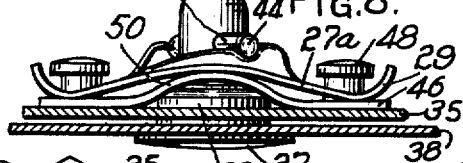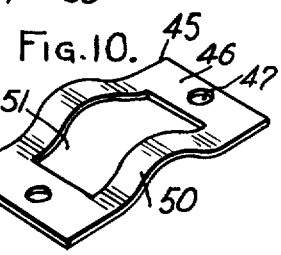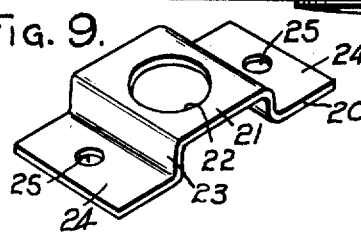

2,306,968

UNITED STATES PATENT OFFICE 2,306,968

ROTARY OPERATIVE FASTENER

Harry A. Mackie, Westwood, Calif., assignor to United-Carr Fastener Corporation, Cambridge, Mass., a corporation of Massachusetts Application September 30, 1941, Serial No. 412,992

3 Claims. (Cl. 24—221)

This invention relates to improvements in rotary operative type fasteners and installations thereof.

The chief object of my invention is the provision of a fastener device comprising a spring member adapted to be secured to one of a number of parts to be fastened together, and a rotary member adapted to be secured to another of the parts to be secured and having means interlocking with the spring member when turned to fastened position. My invention is directed particularly to a member forming a part of the fastener device and preferably adapted to engage the spring to limit movement of the spring toward the part to which it is attached while the members are in fastened engagement.

Other objects and uses of my invention will be apparent from inspection of the drawing and specification hereinbelow set forth.

Referring to the drawing in which I have illustrated a preferred embodiment of my invention:

Fig. 1 is a front elevation showing two plates secured in face-to-face relation by my first form of fastener device;

Fig. 2 is a section taken along the line 2—2 of Fig. 1;

Fig. 3 is a sectional elevation taken on the line 3—3 of Fig. 1, and showing operation of the device to support the spring member when the plates are subjected to forces tending to move them apart flatwise;

Fig. 4 is a sectional view taken on the line 3—3 of Fig. 1 and showing parts of the fastener device in unlocked relation;

Fig. 5 is a front elevation of an installation showing two plates secured in face-to-face relation by my second form of fastener device;

Fig. 6 is a section taken along the line 6—6 of Fig. 5 showing the parts of the fastener device in normal locked relation;

Fig. 7 is a section similar to Fig. 6 showing parts of the fastener device in unlocked relation;

Fig. 8 is a section similar to Fig. 7 showing operation of a part of the device to support the spring member when the plates are subjected to forces tending to move them apart flatwise;

Fig. 9 is a perspective view of the supporting member showing a part of my first form of fastener device; and Fig. 10 is a section of the locking member forming a part of my second form of fastener device.

Referring to the installation illustrated in Figs. 1-4, I have shown one form of fastener device with which I have chosen to illustrate my invention, comprising two units in the form of a spring member 1 and a rotary member 2. The spring member 1 is secured on the inner side 3 of a flat supporting plate 4 and the rotary member 2 is carried by a supporting plate 5 which is adapted to be secured in flat abutting relation to the plate 4. The plate 4, in my preferred form, has an opening 6 surrounded by a frustro-conical embossment 7 (Fig. 3) and the plate 5 has an opening 8 surrounded by an embossment 9 (Fig. 4). The spring member 1 is made of a single piece of wire having coils 10 at its ends which act to receive a rivet by which the wire is secured to the plate 4 and which also operate to render the wire resilient. The wire 1 has a portion intermediate its ends in the form of a locking element 11 which is adapted for interlocking engagement with elements of the rotary member 2 when the rotary member is turned to fastened position.

The rotary member 2 has a head 12 and a shank 13 extending from the head having a tubular end 14. The end 14 has a pair of spiral slots 15 therein and each of the slots provides a cam having a high point 16 (Fig. 4) and an adjacent locking seat 17. The rotary member 2 is preferably secured to the plate 5 by a grommet 18 having a flange 19 (Fig. 4) clinched over the embossment 9 after the stud member has been extended through the plate 6 to limit withdrawal of the stud member. When the stud member is turned, the locking element 11 is drawn over the high points 16 of the slots 15 and thereafter snaps into the locking seats 17 under the tension set up by the coils 10.

The fastener device hereinabove described is well known in the art and forms no part of my present invention except as related to the novel means which I have provided for supporting the spring member 1 against forces tending to draw the spring member in the direction of the plate 3. In order to accomplish this purpose, I have provided a supporting member 20 formed from one piece of relatively stiff material. The supporting member 20 is of generally plate-like form and has a rigid raised portion 21 provided with an opening 22 for receiving the tubular end 14 of the shank of the rotary member. Angular walls 23 of predetermined length extend from opposite ends of the element 22 and terminate in outwardly extending flanges or end portions 24. Each of the end portions has an opening 25 (Fig. 9) for receiving a rivet by which the supporting member is secured to the plate 4. In assembling the parts of my installation, the supporting member 20 is disposed on the inner side of the plate 4 with the flanges 24 abutting the inner surface 3 of the plate 4. Next, the coils 10 of the spring member 1 are applied to the flanges 24 with the openings defined by the coils in alignment with the openings 25 of the supporting member and the locking element in alignment with the opening 22 of the raised portion 21. The spring member and supporting member are secured in fixed relation to the plate 4 and to each other by means of rivets 26, as shown in Figs. 3 and 4. When the parts are in assembly, the raised portion 21 of the supporting member is disposed intermediate the locking element 11 of the spring member and the plate 4 and spaced a predetermined distance from the locking element 11 so as not to engage the locking element when the same is moved into fastened engagement within the seats 17. When the rotary member and spring member are in interlocked engagement the raised portion 21 of the supporting member 20 underlies the locking element of the spring member and is spaced a few thousandths of an inch therefrom, or only just barely farther than the distance over the high point 16.

In operation, the supporting member 20 serves to support the spring member when the same is moved in the direction of the plate 4 while the spring member and rotary member are in fastened engagement. It has been found with modern high-speed aircraft that at high rates of speed the wind enters between the seams of the plates tending to force the plates apart flatwise. When this happens, the rotary members tends to pull the spring member downwardly in the direction of the inner plate 4. As the force tending to separate the plates is often substantially greater than the strength of the spring member, the spring member may be substantially distorted by being pulled toward the plate 4 permitting the plates to move apart a dangerous degree with respect to admitting air between the plates. The supporting member which I have provided as a part of my device operates to correct this condition to a great extent by limiting the distance which the spring member can be pulled in the direction of the plate 4. Thus, it will be seen from inspection of Fig. 3 that when the plates 4 and 5 are moved apart flatwise the spring member can move in the direction of the plate 4 a distance not appreciably greater than that between the locking element 11 and the supporting member 20 when the parts of the fastener device are in the fastened position shown in Fig. 2. The spring is prevented from moving a greater distance by the supporting member 20 which engages the locking element to prevent further distortion of the spring. Thus, as a result of my invention, it is impossible for the plates 4 and 5 to move apart more than a relatively slight distance and consequently there is no danger of the plates being forced apart an abnormal distance nor of the spring member being distorted beyond the limits of its tensional strength.

Referring to Figs. 5-8, I have shown the use of a supporting member in combination with a second form of rotary operative fastener. My second form of fastener comprises a spring member 26ª in the form of a plate which is preferably bowed longitudinally and provides an aperture 27. A pair of slots 28—28 extend from opposite sides of the aperture 27 (Fig. 5) a predetermined distance toward the longitudinal ends 29 of the member. The spring member 26ª has a locking element intermediate the ends 29 providing embossments 30 on opposite sides of the aperture 27 and these embossments are preferably of arc-shape. Each embossment has a gradually rising cam surface 31 extending from a low point adjacent one of the slots 28 and continuing to a high point 32 adjacent the other slot 28. An indentation is provided intermediate the ends of each embossed portion providing locking recesses 33 adapted to receive a lateral projection carried by a rotary member 34. The spring member 26ª is disposed on the inner side of an inner plate member 35 with the aperture 27 thereof substantially in alignment with an aperture 36 (Fig. 6) of the plate 35.

The rotary member 34 has a head 37 abutting the outer surface of an outer plate 38. A base portion 39 extends from the head 37 through an aperture 40 (Fig. 6) of the plate 38 and the aperture 36 of the plate 35. A nose 41 forms a continuation of the base and extends through the opening 27 of the spring member. The rotary member 34 is preferably secured in assembly with the plate 38 by a split ring 42 which is snapped into a groove of the base 39 after the rotary member has been extended through the plate. A pin 43 is driven or otherwise secured in the nose 41 so that opposite ends of the pin extend laterally beyond the nose on opposite sides thereof in a direction transverse to the normal axis of the rotary member. In locking the fastener device the rotary member is moved into position substantially as shown in Fig. 7 with the free ends 44 of the pin member 43 in registration with the slots 28 of the spring member. Rotation of the rotary member in a clock-wise direction viewing Fig. 7 causes the ends 44 of the pin member to engage the cam portions 31 and the spring will thus be compressed until the pin ends reach the locking recesses 33, whereupon the fastener is in locked position and is held against accidental unlocking by the tension of the spring against the pin 43. The fastener which I have just described is not new in itself and its novelty, as respects the present invention, is related only to its use in combination with a supporting member 45 which operates to limit movement of the spring member in the direction of the plate 35 in a manner similar to that in which the supporting member 20 of my first form of installation operates to limit the movement of the spring member 1 toward the plate 4.

The supporting member 45 is rigid in form and preferably provides flat end portions 46, each of which has an aperture 47 for receiving a portion of a rivet 48 by which the same is secured to the inner face 49 of the plate 35. The supporting member has an arc-shaped supporting element 50 of predetermined height intermediate the ends 46 and the supporting element has an aperture 51 (Fig. 10) of sufficient length and width to receive the nose 41 and crosspin 43. The supporting member 45 is applied to the inner surface 49 of the plate 35 with the opening 51 in alignment with the opening 36 of the plate 35. The ends 29 of the spring member 26 are supported by the ends 46 of the supporting member and the supporting member and spring member are secured in fixed assembly with the plate 35 and with each other by rivets 48 in the manner clearly shown in Fig. 6. It will be seen that when the parts are in final assembly the supporting element 50 underlies the spring member 26ª and is spaced a predetermined distance so as not to obstruct maximum compression of the spring member during the action by which the rotary member is turned into interlocked relation with the spring member. It will be seen from inspection of Fig. 6 that when the rotary member and spring member are in locked relation the supporting element is spaced from the spring member and, as a result, when the plates 35 and 38 are subjected to forces tending to separate the same flatwise (Fig. 8) the spring member can be pulled down in the direction of the plate 35, a distance equal only to the normal distance between the elements when the parts are in locked engagement as shown in Fig. 6. Thus, as shown in Fig. 8, the supporting element 45 operates to support the spring member 26ª so as to prevent the same from being distorted to a degree causing the same to crack or otherwise be rendered useless.

I have chosen to illustrate the principles of my invention in connection with two forms of rotary operative devices, but it is understood that the theory of my invention could be applied to devices other than those specifically illustrated and described.

Although I have illustrated and described preferred forms of my invention, I do not wish to be limited thereby because the scope of my invention is best defined by the following claims.

I claim:

1. In a fastener device of the rotary operative type, a spring member adapted to be secured to one of the parts to be fastened, a rotary member adapted to be secured to another of the parts to be fastened, one of said members having a cam and a locking seat and the other of said members having a locking member maintained in said seat under spring tension when said rotary member is turned to fastened position, and a supporting member arranged with relation to said spring to prevent compression of the spring to any appreciable extent greater than the height of the cam and thereby being adapted to engage said spring member to limit movement of the same under forces tending to move said spring in the direction of said supporting member while said rotary member and spring member are in fastened relation while permitting fastening and unfastening of the device.

2. In a fastener device of the rotary operative type, a spring member adapted to be secured to one of the parts to be fastened, a rotary member adapted to be secured to another of the parts to be fastened, interengaging elements provided by said members adapted to interlock when the rotary member is turned to fastened position, and a supporting member adapted to be secured to one of said parts so as normally to underlie said spring member in spaced relation thereto when the fastened members are engaged, said supporting member being adapted to engage said spring member to limit movement of the same under forces tending to move said spring in the direction of said supporting member while said spring member and rotary member are in fastened relation.

3. A fastener installation comprising in combination two parts to be secured together, the first of said parts having an opening therein, a spring member secured to said first part, a rotary member carried by the second of said parts and extending through said first part, said spring member having its ends secured to said first part and a locking element intermediate said ends and spaced from said first part, said locking element interlocking with said rotary member when said member is turned to fastened position, and a supporting member having end portions secured to said first part and a raised portion intermediate said ends, said raised portion underlying said locking element and normally spaced a predetermined distance therefrom, said raised portion being adapted to engage said spring member to limit movement of the same under forces tending to move said spring in the direction of said first part while said rotary member and spring member are in fastened relation.

HARRY A. MACKIE.